(12) United States Patent
Whitener et al.

(10) Patent No.: US 7,808,138 B2
(45) Date of Patent: Oct. 5, 2010

(54) ROTOR POLE CROSSOVER CONNECTION

(75) Inventors: Randy E. Whitener, Oviedo, FL (US); Justin England, Winter Springs, FL (US); Jiping Zhang, Winter Springs, FL (US); Peter J. Clayton, Casselberry, FL (US); Thomas L. Schuchart, Oviedo, FL (US); William C. Gardner, Rock Hill, SC (US)

(73) Assignee: Siemens Energy, Inc., Orlando, FL (US)

( * ) Notice: Subject to any disclaimer, the term of this patent is extended or adjusted under 35 U.S.C. 154(b) by 305 days.

(21) Appl. No.: 11/956,445

(22) Filed: Dec. 14, 2007

(65) Prior Publication Data

US 2008/0143202 A1    Jun. 19, 2008

Related U.S. Application Data

(60) Provisional application No. 60/875,705, filed on Dec. 19, 2006.

(51) Int. Cl.
   *H02K 3/12*    (2006.01)
   *H02K 3/50*    (2006.01)
   *H02K 3/51*    (2006.01)

(52) U.S. Cl. ......................................... 310/71; 310/180

(58) Field of Classification Search .................... 310/71, 310/180, 201, 208, 260, 270
   See application file for complete search history.

(56) References Cited

U.S. PATENT DOCUMENTS

| 3,292,025 | A | * | 12/1966 | Victor | 310/180 |
| 4,321,497 | A | * | 3/1982 | Long | 310/198 |
| 5,063,315 | A | * | 11/1991 | Rasmussen | 310/71 |
| 5,111,097 | A | * | 5/1992 | Londergan et al. | 310/179 |
| 5,623,178 | A | * | 4/1997 | Kawabata et al. | 310/260 |
| 6,930,434 | B1 | * | 8/2005 | Spencer et al. | 310/270 |
| 7,247,966 | B2 | | 7/2007 | Shore et al. | |
| 2001/0010442 | A1 | | 8/2001 | Yasuhara et al. | |
| 2005/0285469 | A1 | | 12/2005 | Shore et al. | |
| 2006/0261691 | A1 | | 11/2006 | Minke et al. | |

FOREIGN PATENT DOCUMENTS

| DE | 1488505 | | 7/1969 |
| FR | 2894408 | A1 | 8/2007 |
| JP | 55071141 | A | 5/1980 |
| JP | 57110045 | A | 8/1982 |
| JP | 60026425 | A | 9/1985 |

* cited by examiner

*Primary Examiner*—Tran N Nguyen

(57) ABSTRACT

A rotor pole crossover connection joint for use in a rotating electrical machine is disclosed. The connection joint integrally couples a bottom rotor coil strap to a rotor pole crossover connector with a single piece connector that reduces, distributes or otherwise tolerates stress concentrations in the connector. A corresponding method of forming a rotor pole crossover connection and a rotor assembly including a rotor pole crossover connection joint are also disclosed.

15 Claims, 3 Drawing Sheets

ROTOR POLE CROSSOVER CONNECTION

CROSS-REFERENCE TO RELATED APPLICATIONS

This application claims the benefit of U.S. Provisional Application No. 60/875,705, filed Dec. 19, 2006, which is incorporated herein by reference.

FIELD OF THE INVENTION

The present invention relates to a rotor pole crossover connection joint, a method of forming a rotor pole crossover connection joint and a rotor assembly for use in a rotating electrical machine.

BACKGROUND OF THE INVENTION

A generator typically includes a rotor that is positioned within a stator such that electrical power is generated through magnetic induction as the rotor rotates within the stator. In a typical large generator such as is used in a power generation plant, the rotor has a substantially cylindrical body and a shaft that extends generally coaxially through the body so as to couple the rotor body to a prime mover such as a steam or gas turbine engine. Axially-extending rotor slots are arranged about the circumference of the rotor body extending radially inward toward a center of the shaft, and rotor conductors are positioned within the rotor slots extending axially the length of the rotor slots. The rotor conductors include end windings, sometimes referred to as end turns, positioned beyond the axial ends of the rotor slots that turn the rotor conductors such that they pass back through a different rotor slot elsewhere in the rotor body forming a plurality of rotor coils wrapped about a corresponding plurality of rotor poles formed in the rotor body.

Conventionally, the rotor conductors are formed of stiff, flat, coiled copper bars, which are also commonly referred to as rotor straps. A single rotor winding is formed by connecting the individual rotor coils in series from the beginning of the first pole to the end of the last pole. Because the rotor straps are made of stiff copper, it is conventional to connect the coil ends of adjacent poles with conductive jumpers, which are commonly known as rotor pole crossovers.

During operation of the generator, large centrifugal forces are exerted on the rotor windings and the rotor pole crossovers. Further, because the generator may be frequently started up and shut down to accommodate power generation demands, the crossovers undergo stressful mechanical and thermal cyclic duty.

SUMMARY OF THE INVENTION

In accordance with a first aspect of the present invention, a rotor pole crossover connection joint in a rotating electrical machine is provided. The joint may comprise a stack of coil straps, a rotor pole crossover leg and a single piece connector that couples the stack of coil straps to the rotor pole crossover leg. The stack of coil straps includes a bottom coil strap and a first coil strap that is stacked atop the bottom coil strap, which extends beyond a termination of the bottom coil strap so as to expose a bottom surface of the first coil strap. The single piece connector couples the termination of the bottom coil strap to the rotor pole crossover connection leg.

The connector may comprise a body member, a coil-side connector arm and a first shoulder. The coil-side connector arm has a coil end that connects to the termination of the bottom coil strap and extends such that an arm surface is positioned adjacent to the exposed bottom surface of the first coil strap. The first shoulder integrally couples the coil-side connector arm to the body member. The connector may further comprise a crossover-side connector arm and a second shoulder. The crossover-side connector arm has a crossover end that connects to the crossover leg and the second shoulder integrally couples the crossover-side connector arm to the body member so as to space the crossover-side connector arm away from the exposed bottom surface of the first coil strap.

In accordance with another aspect of the present invention, a method of forming a rotor pole crossover connection joint in a rotating electrical machine is provided. The method comprises providing a rotor pole crossover leg and providing a stack of coil straps including a bottom coil strap and a first coil strap stacked atop the bottom coil strap so as to extend beyond a termination of the bottom coil strap exposing a bottom surface of the first coil strap. The method further comprises providing a single piece connector that couples the termination of the bottom coil strap to the rotor pole crossover leg.

The connector may have a body member, a coil-side connector arm having a coil end, a first shoulder that couples the body member to the coil-side connector arm, a crossover-side connector arm having a crossover end and a second shoulder that couples the body member to the crossover-side connector arm so as to space the crossover-side connector arm away from the coil-side connector arm.

The method may further comprise connecting the coil end of the coil-side connector arm to the bottom coil strap termination so as to extend generally coplanar with the bottom coil strap such that an arm surface of the coil-side connector arm is positioned adjacent to the exposed bottom surface of the first coil strap. The method may yet further comprise coupling the crossover-side connector arm to the second shoulder and connecting the crossover-side connector arm crossover end to the crossover leg.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof and in which is shown by way of illustration, and not by way of limitation, specific preferred embodiments in which the invention may be practiced. It is to be understood that other embodiments may be utilized and that changes may be made without departing from the spirit and scope of the present invention.

A conventional rotor assembly for use in a rotating electrical machine includes a shaft and a plurality of rotor coils arranged about a circumference of the shaft. In a large rotating electrical machine such as an AC generator used for generation of electrical power in a commercial generation plant, the rotor coils are typically formed from stiff, flat, copper conductors that are referred to herein as coil straps. Rotor pole crossovers connect coil ends of adjacent poles together to form a single, series rotor circuit.

As the rotor assembly rotates, large centrifugal forces are exerted upon the windings and crossovers. Furthermore, such generators may be routinely started up and shut down in response to varying electrical demands of utility customers causing stressful mechanical and thermal cyclic duty in the crossovers and the connections between the crossovers and the coil straps. These forces may cause the rotor pole crossovers to crack and/or the connections between the crossovers and the coil straps to fail.

According to aspects of the present invention, a rotor pole crossover connection joint connects a bottom coil strap of a rotor coil to a rotor pole crossover with a single piece connector that reduces, distributes or otherwise tolerates stress concentrations in the connector. For example, the connector may couple to the coil strap and to the rotor pole crossover in locations where the couplings can more readily tolerate the stresses experienced.

Figure 1:
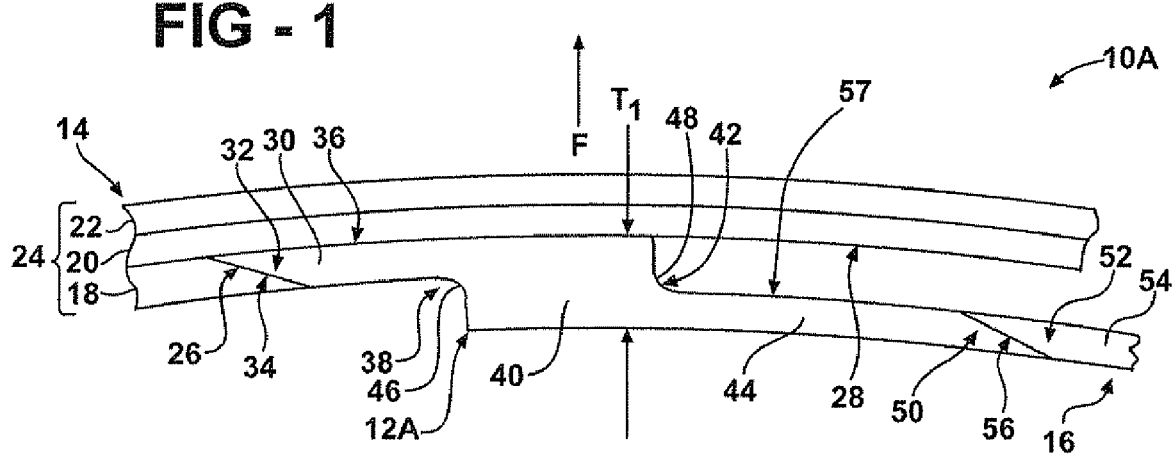
FIG. 1 is an illustration of a rotor pole crossover connection joint formed in accordance with aspects of the present invention.

Referring now to the drawings and particularly to FIG. 1, a rotor pole crossover connection joint 10A is illustrated in accordance with various aspects of the present invention in partial side view. The exemplary connection joint 10A includes a single piece connector 12A that integrally couples a rotor coil 14 to a rotor pole crossover 16. For purposes of clarity of discussion, the rotor coil 14 and rotor pole crossover 16 are only partially shown in FIG. 1.

The rotor coil 14 as illustrated includes a bottom coil strap 18, a first coil strap 20 and a second coil strap 22 forming a stack of coil straps 24. For purposes of clarity of discussion only three coil straps including the bottom 18, first 20, and second coil straps 22 are shown; however, in practice, the rotor coil 14 may include any suitable number of coil straps.

The coil straps 18, 20 and 22 are typically made of stiff, substantially flat copper bars stacked one atop another such that adjacent straps extend generally parallel with one another. For example, the bottom coil strap 18 is positioned at a bottom of the rotor coil 14. The first coil strap 20 is positioned atop the bottom coil strap 18. Similarly, the second coil strap 22 is positioned atop the first coil strap 20. As noted above, additional coil straps (not shown) may be positioned in similar fashion such that a rotor coil 14 including a desired number of coil straps is formed. The bottom coil strap 18 ends in a termination 26 so as to expose a bottom surface 28 of the first coil strap 20.

The single piece connector 12A includes a coil-side connector arm 30 having a coil end 32 that couples to the termination 26 of the bottom coil strap 18 by any suitable method such as resistance brazing. For example, the termination 26 and the coil end 32 may be correspondingly beveled so as to form a first scarf joint 34 by coupling a beveled end of the bottom coil strap 18 to a corresponding beveled end of the coil-side connector arm 30. The coil-side connector arm 30 extends generally coplanar with the bottom coil strap 18 such that an arm surface 36 is positioned adjacent to the exposed bottom surface 28 of the first coil strap 20.

A first shoulder 38 of the single piece connector 12A integrally couples the coil-side connector arm 30 to a body member 40, and a second shoulder 42 of the single piece connector 12A integrally couples the body member 40 to a crossover-side connector arm 44 so as to space the crossover-side connector arm 44 away from the exposed bottom surface 28 of the first coil strap 20.

In the exemplary arrangement shown, the body member 40 and the first and second shoulders 38 and 42 integrally couple the coil-side connector arm 30 to the crossover-side connector arm 44 in the general form of a "Z" shape, such that the crossover-side connector arm 44 extends away from the body member 40 in a direction opposite to a direction that the coil-side connector arm 30 extends away from the body member 40. In this fashion, the crossover-side connector arm 44 extends generally toward the rotor pole crossover 16.

The first shoulder 38 includes a first radiused portion 46 that is configured to reduce a first stress concentration in the single piece connector 12A in an area where the first shoulder 46 couples the coil-side connector arm 30 to the body member 40. The second shoulder 42 includes a second radiused portion 48 that is configured to reduce a second stress concentration in the single piece connector 12A in an area where the second shoulder 42 couples the crossover-side connector arm 44 to the body member 40. In an exemplary single piece connector 12A, the first radiused portion 46 and the second radiused portion 48 may include an arcuate portion having a radius of approximately 0.18 inch; however, it is anticipated that other embodiments of the present invention may include single piece connectors 12A having second radiused portions 48 including arcuate portions with radii other than 0.18 inch.

The crossover-side connector arm 44 includes a crossover end 50 that couples to an end 52 provided on a first crossover leg 54 of the rotor pole crossover 16 by any suitable method such as resistance brazing. For example, the crossover end 50 of the crossover-side connector arm 44 and the end 52 of the first crossover leg 54 may be correspondingly beveled so as to form a second scarf joint 56 by coupling a beveled end of the crossover-side connector arm 44 to a corresponding beveled end of the first crossover leg 54.

The single piece connector 12A may be made from a suitable high strength material such as a copper alloy, for example, a non-annealed copper alloy, so as to tolerate the forces exerted upon the connection joint 10A by the centrifugal forces produced as the rotor assembly rotates and the cyclic mechanical and thermal forces associated with repeated start-up and shut-down of the machine.

Heat that may be applied to the single piece connector 12A during installation of the joint 10A may cause the copper to anneal and weaken in the areas where the heat is applied. For example, a brazing operation that may be utilized to couple the coil-side connector arm 30 in the area of the coil end 32 to the termination 26 of the bottom coil strap 18, e.g., in the area of the first scarf joint 34 or other suitable connection arrangement or a brazing operation that may be utilized to couple the crossover-side connector arm 44 in the area of the crossover end 50 to the end 52 of the first crossover leg 54, e.g., in the area of the second scarf joint 56 or other suitable connection arrangement, may cause the copper to anneal and weaken in the areas where the heat is applied, such as in the areas of the first and second scarf joints 34 and 56 in the illustrative example.

However, in the illustrative example, annealing the copper in the single piece connector 12A, e.g., in the areas of stress, such as in the areas of the first shoulder 38 and the second shoulder 42 is avoided because the heat is moved to the areas of the first scarf joint 34, which is located a spaced distance from the first shoulder 38 and the second scarf joint 56, which is located a spaced distance from the second shoulder 42. For example, in the single piece connector 12A illustrated in FIG. 1, the coil-side connector arm 30 extends away from the first shoulder 38 a suitable distance such that the first scarf joint 34 is located away from the first shoulder 38 sufficiently that the copper in the area of the first shoulder 38 is not annealed by the heat applied during the brazing operation used to join the coil end 32 of the coil-side connector arm 30 to the termination 26 of the bottom coil strap 18 at the first scarf joint 34. Similarly, the crossover-side connector arm 44 extends away from the second shoulder 42 a suitable distance such that the second scarf joint 56 is located away from the second shoulder 42 sufficiently that the copper in the area of the second shoulder 42 is not annealed by the heat applied during the brazing operation used to couple the crossover end 50 of the crossover-side connector arm 44 to the end 52 of the first crossover leg 54 at the second scarf joint 56.

The connection joint 10A may be used in a rotor assembly for a large rotating electrical machine as previously discussed. As the rotor assembly rotates about a shaft (not shown) centrifugal forces act on the coil straps in a direction F. A retaining structure (not shown) beyond a final coil strap (not shown) secures the coil straps in position such that movement of the coil straps in the direction F in response to the centrifugal force is limited. By placing the single piece connector 12A beneath the first coil strap 20 such that the arm surface 36 is adjacent to the exposed bottom surface 28 of the first coil strap 20 as previously described, the single piece connector 12A is supported against the exposed bottom surface 28 such that movement of the single piece connector 12A in response to the centrifugal forces exerted upon the single piece connector 12A in the direction F is limited. In this manner, flexing of the structures at least in the areas of the first and second scarf joints 34 and 56 in the direction F is reduced, and the first and second scarf joints 34 and 56 are more able to tolerate imperfections in the brazed joints and less likely to fail in operation.

A support structure (not shown) may be positioned adjacent to a supported surface 57 of the crossover-side connector arm 44 in order to limit movement of the crossover-side connector arm 44 in the direction F in response to the centrifugal force. As previously discussed, the arm surface 36 of the single piece connector 12A is positioned adjacent to the exposed bottom surface 28 of the first coil strap 20. Accordingly, a plurality of single piece connectors 12A each having a thickness $T_1$ corresponding to a predetermined set of values may be constructed in order to account for manufacturing and assembly tolerances in machine components, e.g., a thickness of the coil straps comprising the rotor coil 14. This may be accomplished by maintaining the thickness of the coil-side connector arm 30 and the crossover-side connector arm 44 constant and selecting a thickness for the body member 40 from among a corresponding predetermined set of values. This allows selecting a single piece connector 12A having a thickness $T_1$ for use in a particular rotor assembly such that the arm surface 36 is adjacent to the exposed bottom surface 28 and the supported surface 57 of the crossover-side connector arm 30 is adjacent to the support structure (not shown). In this manner a space between the arm surface 36 of the coil-side connector arm 30 and the exposed bottom surface 28 of the first coil strap 20 can be minimized and flexing of the single piece connector 12A in response to the centrifugal force in the direction F is correspondingly minimized.

Figure 2:
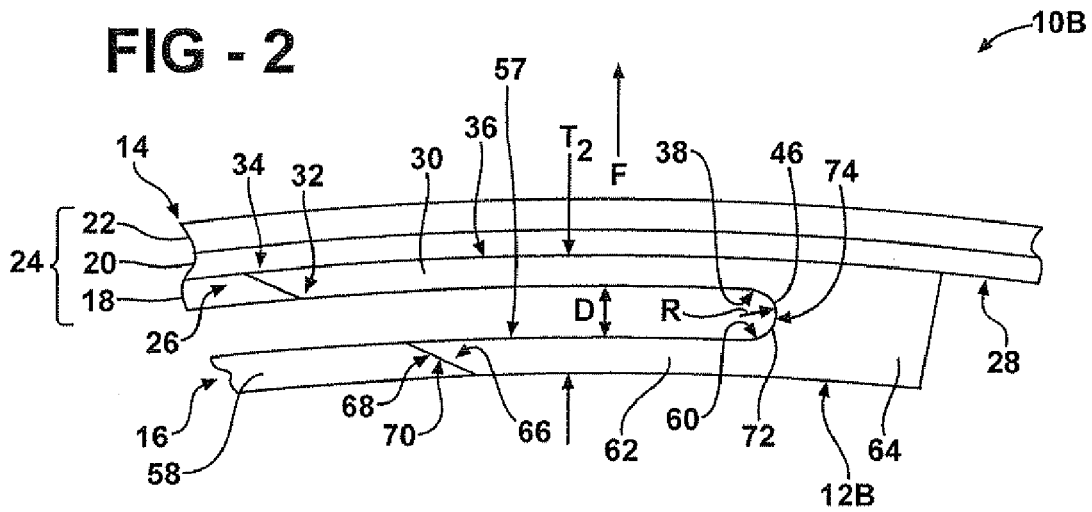
FIG. 2 is an illustration of a rotor pole crossover connection joint formed in accordance with other aspects of the present invention.

Referring now to FIG. 2, a rotor pole crossover connection joint 10B in accordance with other aspects of the present invention is shown in partial side view where like elements are referenced with like reference numerals. The connection joint 10B illustrated in FIG. 2 is similar to the connection joint 10A illustrated in FIG. 1, except as described below.

The exemplary joint 10B includes a single piece connector 12B that integrally couples a rotor coil 14 to a second crossover leg 58 of the rotor pole crossover 16. The single piece connector 12B includes a coil-side connector arm 30 having a coil end 32 that couples to the termination 26 of the bottom coil strap 18 in a manner analogous to that set out with reference to the single piece connector 12A described with reference to FIG. 1. The connector 12B also includes a second shoulder 60 that integrally couples a crossover-side connector arm 62 to a body member 64 such that the crossover-side connector arm 62 extends away from the body member 64 in the same direction as the coil-side connector arm 30 extends away from the body member 64 and substantially parallel thereto. In the exemplary arrangement shown, in FIG. 2, the body member 64 and the first and second shoulders 38 and 60 integrally couple the coil-side connector arm 30 to the crossover-side connector arm 62 in the general form of a reverse "C" shape such that the crossover-side connector arm 62 extends toward the second crossover leg 58 of the rotor pole crossover 16.

The crossover-side connector arm 62 includes a crossover end 66 that couples to an end 68 provided on the second crossover leg 58 of the rotor pole crossover 16 by any suitable method such as resistance brazing in a manner analogous to that set out above. For example, the crossover end 66 of the crossover-side connector arm 62 and the end 68 of the second crossover leg 58 may be correspondingly beveled so as to form a second scarf joint 70 by coupling a beveled end of the crossover-side connector arm 62 to a corresponding beveled end of the second crossover leg 58.

In a manner analogous to that previously discussed with reference to FIG. 1, the second scarf joint 70 is located a spaced distance from the second shoulder 60 so as to prevent heat applied during the brazing operation used to join the crossover end 66 of the crossover-side connector arm 62 to the end 68 of the second crossover leg 58 at the second scarf joint 70 from annealing the copper in the area of the second shoulder 60.

The first radiused portion 46 of the first shoulder 38 and a second radiused portion 72 of the second shoulder 60 combine to form a semicircular portion 74 having a radius R. In the exemplary single piece connector 12B illustrated in FIG. 2, the radius R may have a predetermined dimension such that a distance D between facing surfaces of the coil-side connector arm 30 and the crossover-side connector arm 62 has a corresponding dimension equal to 2×R.

In a manner analogous to that described above, a support structure (not shown) may be positioned adjacent to a supported surface 57 of the crossover-side connector arm 62 in order to limit movement of the crossover-side connector arm 62 in the direction F in response to the centrifugal force. As previously discussed, the arm surface 36 of the single piece connector 12B is positioned adjacent to the exposed bottom surface 28 of the first coil strap 20. Accordingly, a plurality of single piece connectors 12B each having a thickness $T_2$ corresponding to a predetermined set of values may be constructed to account for manufacturing and assembly tolerances in other machine components, e.g., a thickness of the coil straps comprising the rotor coil 14. This may be accomplished by maintaining the thickness of the coil-side connector arm 30 and the crossover-side connector arm 62 constant and selecting a value for the dimension of the radius R from among a corresponding predetermined set of values. In this manner, a plurality of single piece connectors 12B may be constructed each having a different predetermined dimensions D and $T_2$ such that a single piece connector 12B may be individually selected for use in a particular rotor assembly such that the arm surface 36 is adjacent to the exposed bottom surface 28 and the supported surface 57 of the crossover-side connector arm 62 is adjacent to the support structure (not shown).

Figure 3:
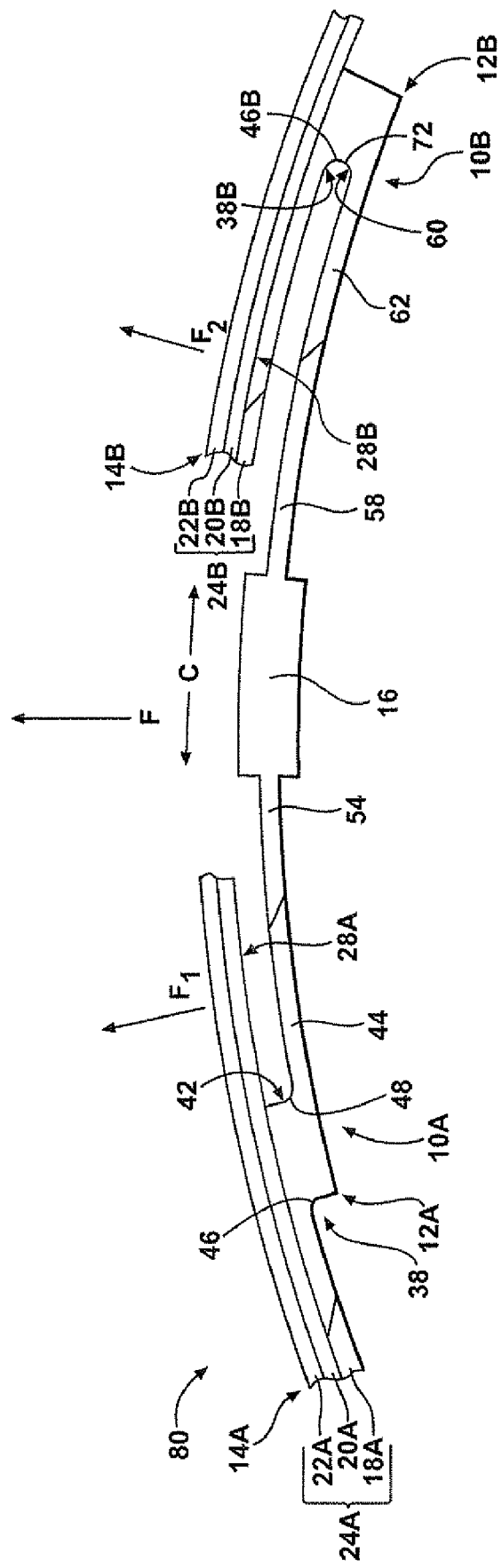
FIG. 3 is an illustration of a rotor assembly formed in accordance with other aspects of the present invention showing a first rotor coil connected to a second rotor coil in partial end view.

Referring now to FIG. 3, a rotor assembly 80 for use in a rotating electrical machine in accordance with other aspects of the present invention is partially shown in side view where like elements are referred to by like reference numerals. For purposes of brevity and clarity, only two rotor coils are shown in FIG. 3; however the principles and concepts of the present invention are applicable to a rotor assembly having any suitable number of rotor coils. As shown, the rotor assembly 80 comprises a first stack of coil straps 24A forming a first rotor coil 14A and a second stack of coil straps 24B forming a second rotor coil 14B. A rotor pole crossover 16, shown diagrammatically in FIG. 3, is positioned between the first rotor coil 14A and the second rotor coil 14B and connects the first rotor coil 14A in series with the second rotor coil 14B. The crossover 16 has a first crossover leg 54 extending generally toward the first rotor coil 14A and a second crossover leg 58 extending generally toward the second rotor coil 14B.

A first crossover connection joint 10A couples the first rotor coil 14A to the first crossover leg 54 and a second crossover connection joint 10B couples the second rotor coil 14B to the second crossover leg 58. The first and second crossover connection joints 10A, 10B are similar to the crossover connection joints 10A and 10B previously discussed with reference to FIGS. 1 and 2, respectively.

As the rotor assembly 80 rotates about the shaft (not shown), centrifugal forces act to move the crossover 16 away from the shaft in the direction F. In a manner analogous to that previously described with reference to FIG. 1, the single piece connectors 12A and 12B are positioned adjacent to the exposed bottom surfaces 28A and 28B of the first coil straps 20A and 20B, respectively, and are supported thereon such that movement of the single piece connectors 12A, 12B away from the shaft in the direction F is limited.

Because the first crossover leg 54 is coupled to the crossover-side connector arm 44 of the first single piece connector 12A, the centrifugal force acts to move the crossover-side connector arm 44 in the direction $F_1$, causing the single piece connector 12A to flex at least in the areas of the first and second shoulders 38 and 42. As previously discussed with reference to FIG. 1, the first and second radiused portions 46 and 48 are configured to reduce, distribute or otherwise tolerate stress concentrations in the areas of the first and second shoulders 38 and 42, respectively, allowing the single piece connector 12 to tolerate the flexing caused by the centrifugal force without failure.

In similar fashion, the second crossover leg 58 is coupled to the crossover-side connector arm 62 of the single piece connector 12B. As a result, the centrifugal force acts to move the crossover-side connector arm 62 in the direction $F_2$, causing the single piece connector 12B to flex at least in the areas of the first and second shoulders 38B and 60. As previously discussed with reference to FIG. 2, the first and second radiused portions 46B and 72 are configured to reduce, distribute or otherwise tolerate stress concentrations in the areas of the first and second shoulders 38B and 60, respectively, allowing the single piece connector 12B to tolerate the flexing caused by the centrifugal force without failure.

The crossover 16 is designed to be flexible in a direction C allowing expansion and contraction in the direction C in response to the cyclic mechanical and thermal forces associated with repeated start-up and shut-down of the machine. In this fashion, the crossover 16 absorbs forces in the direction C that might otherwise be applied to joint 10A, e.g., at the first and second scarf joints 34 and 56 or other suitable coupling arrangement, and to joint 10B, e.g., at the first and second scarf joints 34A and 70 or other suitable coupling arrangement. As a result, the exemplary first and second scarf joints 34 and 56 of the first connection joint 10A and the exemplary first and second scarf joints 34A and 70 are more able to tolerate any imperfections in the brazed joints and less likely to fail in operation.

Figure 4:
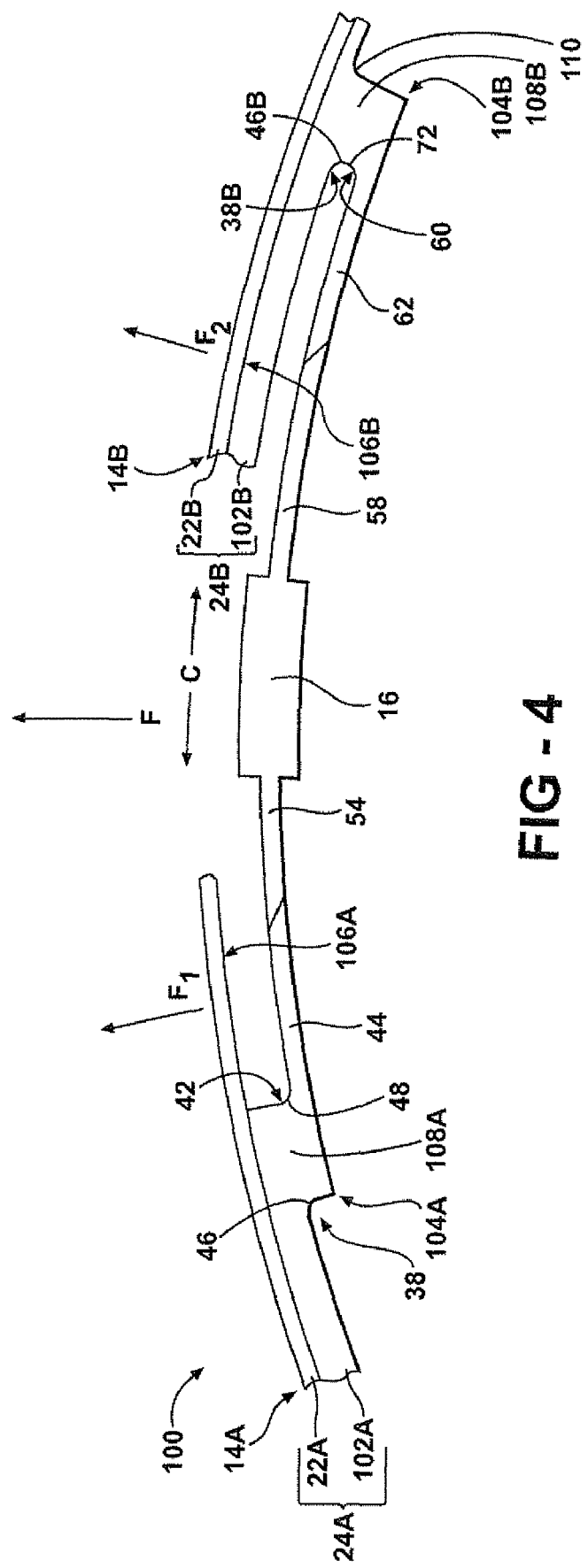
FIG. 4 is a partial end view of the rotor assembly of FIG. 3 showing a first rotor coil connected to a second rotor coil in accordance with other aspects of the present invention.

Referring now to FIG. 4, a rotor assembly 100 for use in a rotating electrical machine in accordance with other aspects of the present invention is partially shown in end view where like elements are referred to by like reference numerals. The rotor assembly 100 is similar to the rotor assembly 80 illustrated in FIG. 3 except as described next.

As shown in FIG. 4, the first rotor coil 14A includes a bottom coil strap 102A having a thickness substantially equal to a sum of a thickness of the bottom coil strap 18A and a thickness of the first coil strap 20A of the first rotor coil 14A, see FIG. 3. Similarly, the second rotor coil 14B includes a bottom coil strap 102B having a thickness substantially equal to a sum of a thickness of the bottom coil strap 18B and a thickness of the first coil strap 20B of the first rotor coil 14A. A first crossover connection joint 104A integrally couples the bottom coil strap 102A of the first rotor coil 14A to the first crossover leg 54, and a second crossover connection joint 104B integrally couples the bottom coil strap 102B of the second rotor coil 14B to the second crossover leg 58. The first crossover connection joint 104A is positioned adjacent to an exposed bottom surface 106A of the second coil strap 22A of the first rotor coil 14A and the second crossover connection joint 104B is positioned adjacent to an exposed bottom surface 106B of the second coil strap 22B of the second rotor coil 14B.

The first crossover connection joint 104A includes a first body member 108A that integrally couples the bottom coil strap 102A of the first rotor coil 14A to a first crossover-side connector arm 44. Similarly, the second crossover connection joint 104B includes a second body member 108B that integrally couples the bottom coil strap 102B of the second rotor coil 14B to a second crossover-side connector arm 62.

In a manner analogous to that described with respect to FIG. 1, the first body member 108A and the first and second shoulders 38 and 42 integrally couple the bottom coil strap 102A to the first crossover-side connector arm 44 in the general form of a "Z" shape such that the first crossover-side connector arm 44 extends away from the first body member 108A in a direction opposite to a direction that the bottom coil strap 102A extends away from the first body member 108A. In a manner analogous to that described with respect to FIG. 2, the second body member 108B and the first and second shoulders 38B and 60 integrally couple the bottom coil strap 102B to the second crossover-side connector arm 62 in the general form of a reverse "C" shape such that the second crossover-side connector arm 62 extends away from the second body member 108B in the same direction that the bottom coil strap 102B extends away from the first body member 108B.

The bottom coil strap 102B may continue beyond the second body member 108B and extend away from the second body member 108B in a direction opposite to the direction that the second crossover-side connector arm 62 extends away from the second body member 108B. The second body member 108B may include a third radiused portion 110 configured to reduce a stress concentration in an area where the bottom coil strap 102B extends beyond the second body member 108B.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A rotor pole crossover connection joint in a rotating electrical machine comprising:
    a rotor coil comprising a stack of coil straps including a bottom coil strap located at a radially inner side of said rotor coil and a first coil strap stacked atop said bottom coil strap so as to extend beyond a termination of said bottom coil strap exposing a bottom surface of said first coil strap;
    a rotor pole crossover comprising a rotor pole crossover leg;
    a single piece connector that couples said termination of said bottom coil strap to said rotor pole crossover leg comprising:
        a body member;
        a coil-side connector arm having a coil end that connects to said termination of said bottom coil strap and extends such that an arm surface is positioned adjacent to said exposed bottom surface of said first coil strap;
        a first shoulder that integrally couples said coil-side connector arm to said body member;
        a crossover-side connector arm having a crossover end that connects to said crossover leg; and
        a second shoulder that integrally couples said crossover-side connector arm to said body member so as to define a space between a face of said crossover-side connector arm and a radially inwardly facing side of said rotor coil.

2. The connection joint of claim 1, wherein said coil-side connector arm and said crossover-side connector arm extend away from said body member in either the same direction or in opposite directions.

3. The connection joint of claim 1, wherein said single piece connector further comprises a non-annealed copper material.

4. The connection joint of claim 1, wherein:
    said first shoulder is configured to reduce a first stress concentration in said single piece connector; and
    said second shoulder is configured to reduce a second stress concentration in said single piece connector.

5. The connection joint of claim 1, further comprising:
    a first scarf joint between said termination of said bottom coil strap and said coil end of said coil-side connector arm; and
    a second scarf joint between said crossover leg and said crossover end of said crossover-side connector arm.

6. The connection joint of claim 5, wherein said first scarf joint and said second scarf joint comprise brazed scarf joints.

7. The connection joint of claim 6, wherein:
    said first scarf joint is located a spaced distance from said first shoulder; and
    said second scarf joint is located a spaced distance from said second shoulder.

8. A rotor assembly in a rotating electrical machine comprising:
    first and second rotor coils, each of said first and second rotor coils comprising a stack of coil straps including a bottom coil strap located at a radially inner side of a respective one of said rotor coils;
    a first crossover connection joint integrally extending from said bottom coil strap of said first rotor coil and comprising a first single piece connector having:
        a first body member;
        a first crossover-side connector arm; and
        a first shoulder that integrally couples said first crossover-side connector arm to said first body member so as to define a space between a face of said first crossover-side connector arm and a radially inwardly facing side of said first rotor coil;
    a second crossover connection joint integrally extending from said bottom coil strap of said second rotor coil and comprising a second single piece connector having:
        a second body member;
        a second crossover-side connector arm; and
        a second shoulder that integrally couples said second crossover-side connector arm to said second body member so as to define a space between a face of said second crossover-side connector arm and a radially inwardly facing side of said second rotor coil; and
    a rotor pole crossover having a first crossover leg coupled to said first crossover-side connector arm and a second crossover leg coupled to said second crossover-side connector arm so as to position said rotor pole crossover between said first and second crossover connection joints.

9. The rotor assembly of claim 8, wherein:
    said first crossover-side connector arm of said first crossover connection joint extends away from said first body member in a first direction and said bottom coil strap of said first rotor coil extends away from said first body member in a second direction opposite from said first direction; and
    said second crossover-side connector arm of said second crossover connection joint and said bottom coil strap of said second rotor coil extend away from said second body member in a single direction.

10. The rotor assembly of claim 8, wherein said first crossover connection joint and said second crossover connection joint further comprise a non-annealed copper material.

11. The rotor assembly of claim 8, wherein:
    said first shoulder is configured to reduce a first stress concentration in said first crossover connection joint; and
    said second shoulder is configured to reduce a second stress concentration in said second crossover connection joint.

12. The rotor assembly of claim 8, further comprising:
    a first scarf joint between said first crossover-side connector arm and said first crossover leg; and
    a second scarf joint between said second crossover-side connector arm and said second crossover leg, wherein said first scarf joint and said second scarf joint comprise brazed scarf joints.

13. The rotor assembly of claim 12, wherein:
    said first scarf joint is located a spaced distance from said first shoulder; and
    said second scarf joint is located a spaced distance from said second shoulder.

14. The connection joint of claim 1, wherein said body member extends radially inwardly from said coil-side connector arm to said crossover-side connector arm.

15. The connection joint of claim 8, wherein:
said first single piece connector comprises a coil-side connector arm connected to a termination of said bottom coil strap of said first rotor coil, and said first body member extends radially inwardly from said coil-side connector arm to said crossover-side connector arm of said first single piece connector; and said second single piece connector comprises a coil-side connector arm connected to a termination of said bottom coil strap of said second rotor coil, and said second body member extends radially inwardly from said coil-side connector arm to said crossover-side connector arm of said second single piece connector.

\* \* \* \* \*